United States Patent
Sugaki et al.

(10) Patent No.: US 10,647,404 B2
(45) Date of Patent: May 12, 2020

(54) UNMANNED AERIAL VEHICLE

(71) Applicant: PRODRONE CO., LTD., Nagoya-shi, Aichi (JP)

(72) Inventors: Kiyokazu Sugaki, Nagoya (JP); Kazuo Ichihara, Nagoya (JP)

(73) Assignee: PRODRONE CO., LTD., Nagoya-shi (JP)

(*) Notice: Subject to any disclaimer, the term of this patent is extended or adjusted under 35 U.S.C. 154(b) by 0 days.

(21) Appl. No.: 16/089,305

(22) PCT Filed: Apr. 13, 2017

(86) PCT No.: PCT/JP2017/015108
§ 371 (c)(1),
(2) Date: Sep. 27, 2018

(87) PCT Pub. No.: WO2017/183551
PCT Pub. Date: Oct. 26, 2017

(65) Prior Publication Data
US 2019/0112025 A1    Apr. 18, 2019

(30) Foreign Application Priority Data
Apr. 19, 2016  (JP) .................................. 2016-083760

(51) Int. Cl.
*B64C 1/00*    (2006.01)
*B64C 1/22*    (2006.01)
(Continued)

(52) U.S. Cl.
CPC ................ *B64C 1/22* (2013.01); *B64C 1/063* (2013.01); *B64C 1/28* (2013.01); *B64C 1/30* (2013.01);
(Continued)

(58) Field of Classification Search
CPC .. B64C 1/063; B64C 1/28; B64C 1/30; B64C 27/50; B64C 27/56; B64C 27/30;
(Continued)

(56) References Cited

U.S. PATENT DOCUMENTS 8,453,962 B2 *  6/2013  Shaw ...................... B64C 27/20
                                                          244/12.4
9,573,683 B2 *  2/2017  Martin .................... B64C 27/50
(Continued)

FOREIGN PATENT DOCUMENTS

JP    2010-120641 A    6/2010
JP    2013-530091 A    7/2013
(Continued)

OTHER PUBLICATIONS

Jun. 19, 2018 Decision to Grant a Patent issued in Japanese Patent Application No. 2018-513140.
(Continued)

*Primary Examiner* — Richard R. Green
*Assistant Examiner* — Steven J Shur
(74) *Attorney, Agent, or Firm* — Oliff PLC

(57) ABSTRACT

To provide an unmanned aerial vehicle that is optimized for freight purposes and that efficiently performs loading and unloading of freight and efficiently performs airframe management. This object is solved by an unmanned aerial vehicle that includes a plurality of propellers. An airframe of the unmanned aerial vehicle includes: a body having a freight chamber that is a hollow portion and that is integral with the body; and a plurality of arms supporting each of the plurality of propellers. A combination of the one arm and the one propeller or plurality of propellers supported by the one arm constitute a retractable propeller. The retractable propeller is partially or entirely storable in the freight chamber.

8 Claims, 8 Drawing Sheets

(51) Int. Cl.
- *B64C 1/30* (2006.01)
- *B64C 27/00* (2006.01)
- *B64C 27/08* (2006.01)
- *B64C 27/20* (2006.01)
- *B64C 27/50* (2006.01)
- *B64C 27/56* (2006.01)
- *B64D 9/00* (2006.01)
- *B64C 39/02* (2006.01)
- *B64C 1/06* (2006.01)
- *B64C 27/30* (2006.01)
- *B64C 1/28* (2006.01)

(52) U.S. Cl.
CPC .............. *B64C 27/08* (2013.01); *B64C 27/20* (2013.01); *B64C 27/30* (2013.01); *B64C 27/50* (2013.01); *B64C 27/56* (2013.01); *B64C 39/02* (2013.01); *B64C 39/024* (2013.01); *B64D 9/00* (2013.01); *B64C 2001/0045* (2013.01); *B64C 2201/108* (2013.01); *B64C 2201/128* (2013.01); *B64C 2201/162* (2013.01); *B64C 2201/165* (2013.01)

(58) Field of Classification Search
CPC .. B64C 1/22; B64C 1/00; B64C 27/00; B64C 27/08; B64C 27/20
USPC ........................................... 244/17.11, 17.23
See application file for complete search history.

(56) References Cited

U.S. PATENT DOCUMENTS

| | | | |
|---|---|---|---|
| 9,749,540 B2 * | 8/2017 | Sabe | H04N 5/23293 |
| 10,155,585 B2 | 12/2018 | Johannesson et al. | |
| 10,407,162 B2 | 9/2019 | Datta | |
| 2006/0011777 A1 | 1/2006 | Arlton et al. | |
| 2009/0008499 A1 | 1/2009 | Shaw | |
| 2010/0044499 A1 | 2/2010 | Dragan et al. | |
| 2013/0256464 A1 * | 10/2013 | Belik | B64C 35/008 244/4 R |
| 2014/0313332 A1 * | 10/2014 | Sabe | H04N 5/23293 348/144 |
| 2017/0253333 A1 | 9/2017 | Baudet | |
| 2018/0178896 A1 * | 6/2018 | Lee | B64C 11/28 |

FOREIGN PATENT DOCUMENTS

| | | |
|---|---|---|
| JP | 2014-212479 A | 11/2014 |
| WO | 2015/109322 A1 | 7/2015 |
| WO | 2016/034819 A1 | 3/2016 |

OTHER PUBLICATIONS

Oct. 19, 2018 IPRP issued in International Patent Application No. PCT/JP2017/01518.

May 30, 2017 International Search Report issued in International Patent Application No. PCT/JP2017/015108.

Feb. 5, 2020 Office Action issued in U.S. Appl. No. 16/576,250.

* cited by examiner

UNMANNED AERIAL VEHICLE

TECHNICAL FIELD

The present invention relates to an unmanned aerial vehicle.

BACKGROUND ART

Conventional small-size unmanned aerial vehicles represented by industrial unmanned helicopters have had airframes too expensive to be affordable. Also, these vehicles used to require skillful pilotage for stable flight. In recent years, however, there have been considerable improvements in sensors and software used to control posture of unmanned aerial vehicles and to implement autonomous flight of unmanned aerial vehicles. This has led to considerable improvement in manipulability of unmanned aerial vehicles and availability of high-end airframes at lower prices. Under the circumstances, multi-copters, especially small size multi-copters, are currently not only used for hobbyist purposes but also applied to various missions in a wide range of fields.

CITATION LIST

Patent Literature

PTL1: JP 2010-120641 A

SUMMARY OF INVENTION

Technical Problem

As the use of unmanned aerial vehicles for freight purposes becomes more and more common, strict demands are likely to emerge, such as: a demand for space efficiency with which a large number of airframes are stored in an area of space; and a demand for efficiency of the work of loading and unloading of freight, in addition to those for freight performance and safety.

In light of the above-described problems, a problem to be solved by the present invention is to provide an unmanned aerial vehicle that enables a large number of airframes to be stored with improved space efficiency, that carries freight safely and stably, and that performs the work of loading and unloading of freight efficiently.

Solution to Problem

In order to solve the above-described problem, the present invention provides an unmanned aerial vehicle that includes a plurality of propellers. An airframe of the unmanned aerial vehicle includes: a body having a freight chamber that is a hollow portion and that is integral with the body; and a plurality of arms supporting each of the plurality of propellers. A combination of the one arm and the one propeller or plurality of propellers supported by the one arm constitute a retractable propeller. The retractable propeller is partially or entirely storable in the freight chamber.

In a typical multi-copter, a plurality of arms radially extend from the center of the airframe, and a propeller is mounted on the leading end of each arm. When such multi-copter is not in use and stored, the arms and the propellers take up much space. The unmanned aerial vehicle according to the above-described configuration includes a freight chamber integral with the body, and the arms and the propellers are storable in the freight chamber. This increases the number of unmanned aerial vehicles storable in a storage space.

Also in the unmanned aerial vehicle according to the above-described configuration, the freight chamber is provided in the airframe in advance. This eliminates the need for providing an additional attachment dedicated to carrying freight. Also, the freight chamber is spacious and thus capable of carrying freight that vary in number, size, and kind. Further, the above-described configuration prevents the airframe from keeping the center of gravity at an excessively low position, as compared with a configuration in which a piece of freight is attached to a lower portion of the airframe. This enables the airframe to more easily maintain a balance. More specifically, an unmanned aerial vehicle having a plurality of propellers performs position control in horizontal directions, movement control, and posture control by inclining the airframe as a whole. Generally, the airframe becomes more stable as the center of gravity is kept at a lower position. However, this causes such an adverse effect that the airframe becomes more difficult to incline. As the airframe becomes more and more difficult to incline, it becomes difficult to control the airframe to move quickly. In light of the circumstances, it is important from an airframe stability standpoint to keep the center of gravity at a position high enough to enable the airframe to incline. In the unmanned aerial vehicle according to the above-described configuration, freight is contained in the airframe of the unmanned aerial vehicle. This minimizes the difficulty with which the airframe maintains a balance.

On the airframe, another airframe may preferably be placeable.

In the unmanned aerial vehicle according to the above-described configuration, airframes are stackable on top of one another. This enables the storage space of the unmanned aerial vehicle to be used three-dimensionally, that is, makes the storage space an area of volume, with height added to the area of space of the storage space. Further, by storing the arms and the propellers in the freight chamber, the number of unmanned aerial vehicles storable in the storage space is maximized.

Also, each of the plurality of arms may preferably have a base end portion that is located at the side of the body in a longitudinal direction of the each arm and that is turnably supported by the body. The retractable propeller may preferably be storable in the freight chamber or expandable from the freight chamber by turning the retractable propeller about the base end portion serving as the turning center.

With such a configuration in which the retractable propeller is storable in the freight chamber by turning the retractable propeller about its base end, the retractable propeller is stored and unfolded in a simple manner.

Also, the base end portion may be turnable in a horizontal direction relative to the body, and the retractable propeller may include a plurality of units of retractable propellers in a circumferential direction of the body, each one unit of the plurality of units comprising two retractable propellers having a common turning center.

Two retractable propellers having a common arm turning center are grouped as one unit, and the two retractable propellers are displaced from each other in the vertical direction (axial direction of the turning center). This increases the number of propellers mountable and increases the maximum lift force of the airframe, ensuring that heavy objects can be carried more stably.

Also, the two retractable propellers constituting the one unit may preferably be expandable to positions at which the two retractable propellers do not overlap each other in the circumferential direction of the body.

The arrangement in which two propellers overlap each other in the vertical direction leads to such a problem that there is a large amount of loss of lift force, especially when the gap between the propellers is small. In the unmanned aerial vehicle according to the above-described configuration, two retractable propellers constituting one unit are expandable to positions at which the two retractable propellers do not overlap each other. This minimizes the loss of lift force.

Also, the freight chamber may preferably have an opening at an upper portion of the freight chamber.

In such an application that a piece of freight is attached to a typical multi-copter, it is necessary to temporarily lift the airframe up and fix the freight to a lower portion of the airframe. Thus, the freight mounting work is complicated. The same applies in the freight removal work. In such an application that a piece of freight is suspended from the airframe using a string member such as a wire, it is necessary to perform, at a side of the airframe on land, the work of connecting the freight to a lower portion of the airframe. In order to connect freight in a simple manner, it is necessary to devise a suspending structure for this purpose. Also, in such an application that a piece of freight is carried by being suspended from the airframe, the center of gravity of the airframe is kept at a low position, as described above. This causes such a problem that the stability of the airframe at take off time and flight time is undermined. In the unmanned aerial vehicle according to the above-described configuration, the freight chamber has an opening at an upper portion of the freight chamber. This ensures that freight can be inserted and retrieved into and from the freight chamber through the opening of the freight chamber. This makes the work of loading and unloading of freight efficient.

Also, the unmanned aerial vehicle may preferably further include one container or a plurality of containers attachable and detachable to and from the freight chamber. A piece of freight may preferably be put in the container, and the piece of freight in the container may preferably be contained in the freight chamber.

Also, the container may preferably have a standardized shape.

In such an application that pieces of freight are directly contained in a freight chamber, the work of filling the gaps between the pieces of freight with shock-absorbing material is difficult to stylize. Thus, this work is not an efficient part of the distribution process as a whole. By using a container of a predetermined size as a unit container and packaging a piece of freight in the container, "containerization" of freight can be implemented, resulting in streamlining and automation of packaging work.

Also, at least one of a plurality of retractable propellers and the container may be containable simultaneously in the freight chamber.

Making the number of propellers adjustable according to the load of freight increases energy efficiency at the time of transportation.

Also, in the unmanned aerial vehicle according to the present invention, a plurality of through holes connected to the freight chamber may be formed on an outer peripheral surface of the body. Each of the plurality of arms may include a base end portion that is located at a side of the body in a longitudinal direction of the each arm and that is located in the through hole and supported by the body. The each arm may be storable in the freight chamber by being inserted further into the through hole. The retractable propeller may be expandable by pulling the each arm out of the body.

By sliding each arm in its longitudinal direction, each arm is inserted and pulled into and out of the freight chamber. Thus, each retractable propeller (arm) is stored and unfolded in a simple manner.

Also, each of the plurality of propellers may preferably include a blade foldable in a circumferential direction of the each propeller.

By storing each arm into the freight chamber and folding the blade along the outer shape of the body, the unmanned aerial vehicle can be stored in a more compact form.

Also, the retractable propeller may include two propellers aligned in a vertical direction in a coaxial manner. The retractable propeller may preferably include a plurality of retractable propellers arranged along the circumferential direction of the body.

Each retractable propeller includes two retractable propellers. This increases the lift force of the unmanned aerial vehicle, resulting in increased transportable weight on the unmanned aerial vehicle.

Advantageous Effects of Invention

Thus, the unmanned aerial vehicle according to the present invention stores a large number of airframes with improved space efficiency, carries freight safely and stably, and performs the work of loading and unloading of freight efficiently.

DESCRIPTION OF EMBODIMENTS

Figure 1:
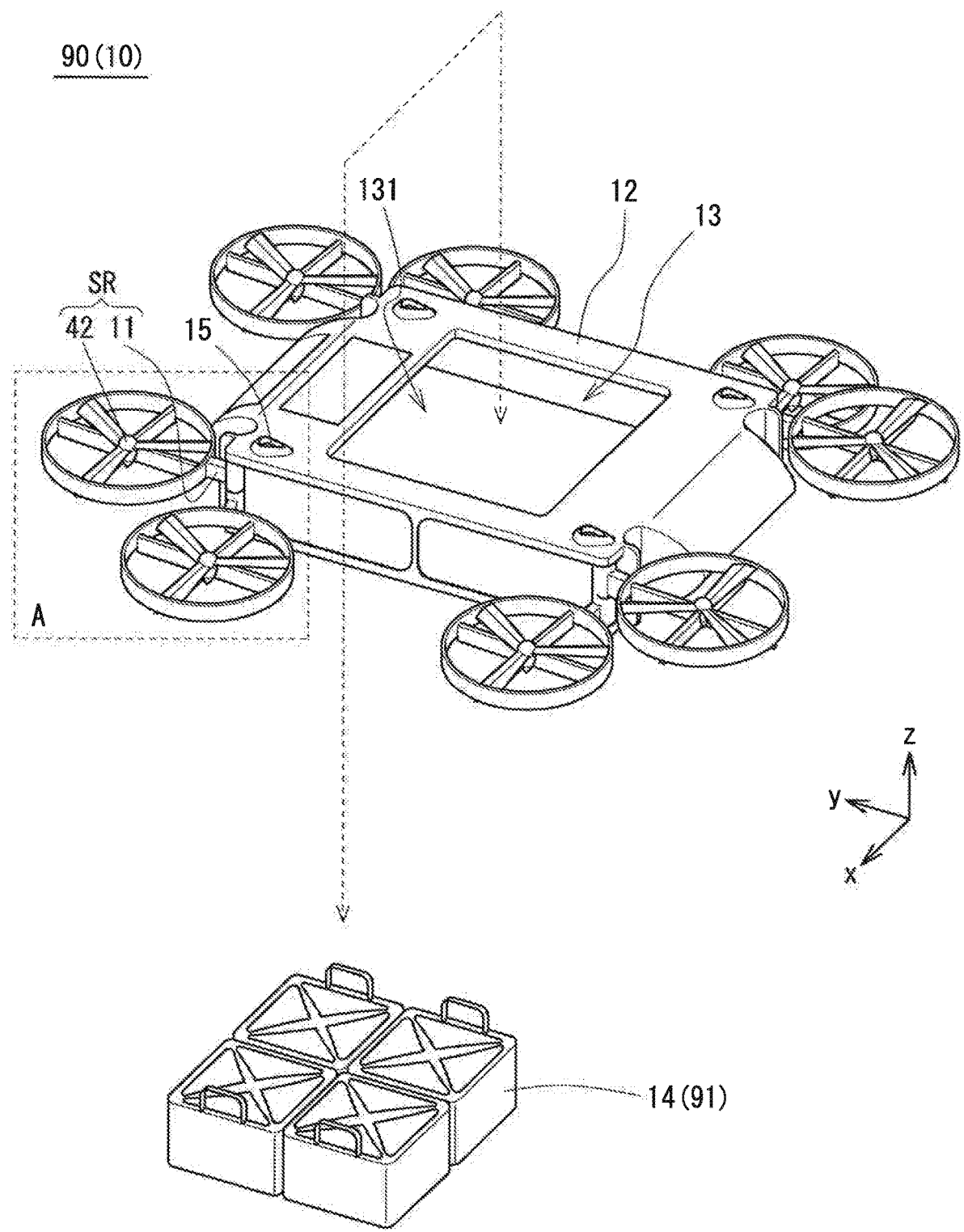
FIG. 1 is a perspective view of an exterior appearance of an unmanned aerial vehicle according to an embodiment.

Embodiments of the present invention will be described in detail below by referring to the drawings. A multi-copter 90 according to this embodiment is an example unmanned aerial vehicle having a plurality of propellers. As used herein, the terms "upward", "upper", "downward", and "lower" refer to vertical directions in FIG. 1, which are parallel to the z axis direction of the coordinate axes illustrated in some of the drawings. Also as used herein, the term "horizontal" refers to xy plane directions in the coordinate axes. Also as used herein, "circumferential direction" of the multi-copter (and a multi-copter 96 according to another embodiment) refers to a circumferential direction in the yawing direction of the multi-copter.

[Container Configuration]

FIG. 1 is a perspective view of an exterior appearance of the multi-copter 90. An airframe 10 of the multi-copter 90 mainly includes: a box-shaped body 12, which has an approximately rectangular parallelepiped shape; and a plurality of arms 11, which radially extend in horizontal directions from portions of the body 12 corresponding to the apices of the body 12 in the circumferential direction. Each of the arms 11 supports a rotor that includes a blade 42, which constitute a fixed pitch propeller. In the body 12, a freight chamber 13 is located. The freight chamber 13 has an opening 131 at an upper portion of the freight chamber 13.

In the multi-copter 90, the freight chamber 13 is integral with the airframe 10, that is, the freight chamber 13 is undetachable from the airframe 10. This eliminates the need for providing an additional attachment or equipment dedicated to transportation of freight 91. As used herein, the term "piece of freight" refers to a "piece of freight" and an article carried and transported by the unmanned aerial vehicle.

In such an application that a piece of freight is attached to a typical multi-copter, it is necessary to temporarily lift the airframe up and fix the freight to a lower portion of the airframe. Thus, the freight mounting work is complicated. The same applies in the freight removal work. In such an application that a piece of freight is suspended from the airframe using a string member such as a wire, it is necessary to perform, at a side of the airframe on land, the work of connecting the freight to a lower portion of the airframe. In order to connect freight in a simple manner, it is necessary to devise a suspending structure for this purpose. In the multi-copter 90, the freight chamber 13 has the opening 131 at an upper portion of the freight chamber 13. This enables a worker to access the freight chamber 13 from above the freight chamber 13. This makes the work of loading and unloading of the freight 91 efficient.

Also in the multi-copter 90, the freight chamber 13 is integral with the airframe 10. This minimizes the influence that the freight has on the airframe balance, as compared with a configuration in which a piece of freight is attached to a lower portion of the airframe. Generally, the airframe becomes more stable as the center of gravity is kept at a lower position. However, this causes such an adverse effect that the airframe becomes more difficult to incline. As the airframe becomes more and more difficult to incline, it becomes difficult to control the airframe to move quickly. In light of the circumstances, it is important from an airframe stability standpoint to keep the center of gravity at a position high enough to enable the airframe to incline. In the multi-copter 90 according to this embodiment, the freight 91 is contained in the airframe 10. This minimizes the difficulty with which the airframe maintains a balance.

The freight chamber 13 includes four containers 14, which are containers mountable in the freight chamber 13. The freight 91, which is a piece of freight carried by the multi-copter 90, is collected on a one-container-14 basis and contained in the freight chamber 13 on a one-container-14 basis. The containers 14 according to this embodiment have standardized shapes for the sake of efficiency and simplicity of packaging work. This form of the containers 14, however, will not limit the form of the containers according to the present invention. Each container according to the present invention may have any of other shapes insofar as combined containers fit in the freight chamber without gaps. For example, it is possible to prepare a plurality of containers of different sizes so as to secure a range of sizes of freight that can be carried in the freight chamber. Further, it is possible to prepare one container that occupies the entire volume of the freight chamber.

In the multi-copter 90, a container 14 of a predetermined size is regarded as a packaging unit, and the freight 91 is packaged in the container 14. This promotes "containerization".

While the freight chamber according to the present invention preferably includes a container, a container is not an essential configuration. There may be a case where it is more convenient to directly contain freight in the freight chamber, without using a container. There also may be a case where there is no particular work efficiency problem in directly containing freight in the freight chamber. In such cases, it is possible to provide a lid on the upper surface opening 131 so that freight can be directly contained in the freight chamber.

[Flight Functions]

Figure 2:
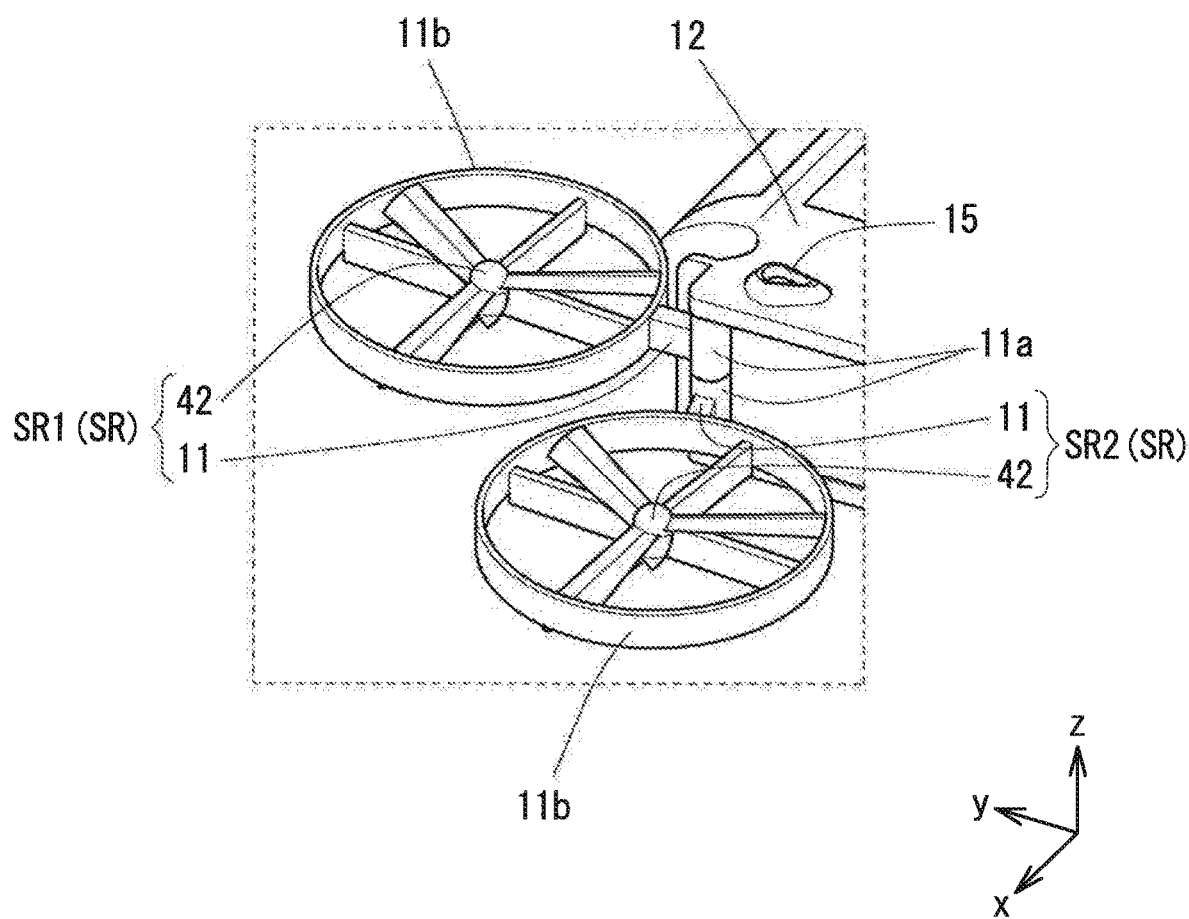
FIG. 2 is a block diagram illustrating a functional configuration of the unmanned aerial vehicle according to the embodiment.

FIG. 2 is a block diagram illustrating a functional configuration of the multi-copter 90. The airframe of the multi-copter 90 includes: a flight the controller 20; a plurality of rotors R; an ESC 43 (Electric Speed Controller), which controls rotation of the rotors R; a wireless transmitter-receiver 33, which wirelessly communicates with a handling terminal 95 of an operator; and a battery 51, which supplies power to the foregoing elements.

Each of the rotors R includes: a motor 41, which is a DC motor; and the blade 42, which is mounted on the output shaft of the motor 41. The ESC 43 is connected to the motor 41 of the rotor R and causes the motor 41 to rotate at a speed specified by the flight controller FC. While the multi-copter 11 according to this embodiment is an octocopter equipped with eight rotors R, the number of the rotors R will not be limited to eight; the multi-copter 11 may be a quadcopter that includes four rotors R. The multi-copter 11 may have any other number of rotors R, which may be determined considering required flight stability, cost tolerated, and other considerations. Examples include a hexacopter that includes six rotors R, and even a multi-copter that includes more than eight rotors.

The flight controller FC includes a controller 20, which is a micro-controller. The controller 20 includes: a CPU 21, which is a central processing unit; a memory 22, which is a storage device such as ROM and RAM; and a PWM controller 23, which controls the number of rotations of each motor 41 and the rotation speed of each motor 41 through the ESC 43.

The flight controller FC further includes a flight control sensor group 31 and a GPS receiver 32 (these will be hereinafter occasionally referred to as "sensors"). The flight control sensor group 31 and the GPS receiver 32 are connected to the controller 20. The flight control sensor group 31 of the multi-copter 90 according to this embodiment includes an acceleration sensor, an angular velocity sensor, a pneumatic sensor (altitude sensor), and a geomagnetic sensor (direction sensor). The controller 20 is capable of obtaining, from these sensors, how much the airframe is inclined or turning, latitude and longitude of the airframe on flight, flight altitude, and position information of the airframe including nose azimuth.

The memory 22 of the controller 20 stores a flight control program FCP, in which a flight control algorithm for controlling the posture of the multi-copter 90 during flight and controlling basic flight operations is described. In response to an instruction from an operator (handling terminal 95), the flight control program FCP adjusts the number of rotations of each rotor R based on the current position of the multi-copter 90 obtained from the sensors so as to correct the posture and/or position of the airframe while the multi-copter 90 is making a flight.

The multi-copter 90 may be manipulated by the operator using the handling terminal 95. Another possible example is to register parameters, such as latitude longitude, flight altitude, and flight route, in the flight control program FCP in advance and to cause the multi-copter 90 to fly autonomously to the destination (this kind of autonomous flight will be hereinafter referred to as "autopilot"). This embodiment is basically under the assumption that the multi-copter 90 is caused to make an autonomous flight to a predetermined destination by autopilot.

Thus, the multi-copter 90 according to this embodiment has high-level flight control functions. It is to be noted, however, that insofar as the unmanned aerial vehicle according to the present invention includes a freight chamber and is capable of flying using a plurality of propellers, the unmanned aerial vehicle according to the present invention encompasses an unmanned aerial vehicle with some of the sensors omitted, an unmanned aerial vehicle without autopilot function, and an unmanned aerial vehicle capable of flying only by manual manipulation. Also, while the multi-copter 90 according to this embodiment is suitable for outdoor freight transportation because of the employment of the GPS receiver 32 to detect latitude and longitude of the multi-copter 90 during flight, the unmanned aerial vehicle according to the present invention may be used for indoor freight transportation as well. Specifically, the unmanned aerial vehicle may be provided with a near-field wireless communication module that identifies the current flight position by communicating with devices dispersed in a facility, examples of the module including Wi-Fi (registered trademark) access points and Bluetooth (registered trademark) low-energy beacons.

[Space-Saving Configuration]

FIG. 2 is an enlarged view of the portion indicated by broken line A in FIG. 1. A combination of each arm 11 of the multi-copter 90 and a corresponding blade 42 supported by the arm 11 constitutes a retractable propeller SR (SR1, SR2). Each arm 11 has a base end portion 11a, which is the body 12 side end of the arm 11 in its longitudinal direction. The base end portion 11a is turnably supported by the body 12. At the leading end of the arm 11 opposite to the base end portion 11a, a rotor guard 11b is located. The rotor guard 11b protects the blade 42. The rotor guard 11b is an optional configuration and may be omitted. In this embodiment, the rotor guard 11b is regarded as part of the arm 11.

Each retractable propeller SR according to this embodiment, includes, as one unit, two retractable propellers SR1, SR2, which have a common turning center. As illustrated in FIG. 1, four units of retractable propellers SR1, SR2 in the circumferential direction of the body 12. As described earlier, the number of the rotors R, that is, the number of the retractable propellers SR may be subject to change insofar as a plurality of retractable propellers SR are provided. In this embodiment, two retractable propellers SR1, SR2 having a common turning center are regarded as one unit and arranged such that the retractable propellers SR1, SR2 are displaced from each other in the vertical direction. This increases the number of the retractable propellers SR mountable and increases the maximum lift force of the airframe. This ensures that even heavy weight freight can be carried stably.

Figure 4:
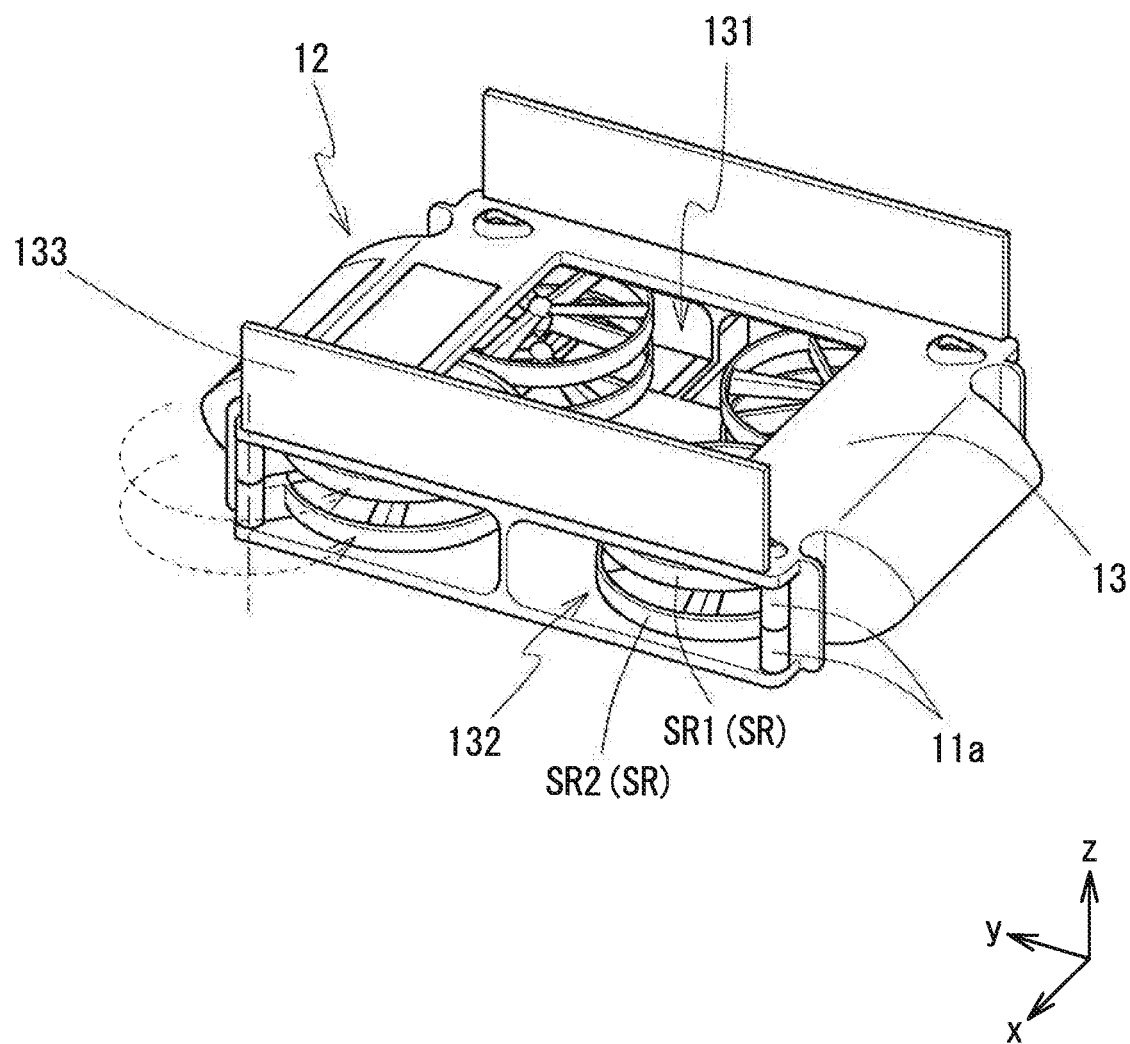
FIG. 4 is a perspective view of an exterior appearance illustrating retractable propellers contained in a freight chamber.

FIG. 4 is a perspective view of an exterior appearance illustrating the retractable propellers SR of the multi-copter 90 contained in the freight chamber 13. Slidable plates 1 are mounted on two side surfaces of the freight chamber 13 of the multi-copter 90 in the x direction of the coordinate axes illustrated in FIG. 4. The slidable plates 133 are planar members slidable upward and downward. While this embodiment is described under the assumption that the slidable plates 133 are openable and closable manually, the slidable plates 133 may be openable and closable using an actuator such as a servo mechanism.

As illustrated in FIG. 4, the slidable plates 133 slide upward, leaving side openings 132 of the freight chamber 13 open. Then, the retractable propellers SR1, SR2 are turned about the base end portion 11a serving as a turning center toward the side openings 132, causing the retractable propellers SR1, SR2 to be stored in the freight chamber 13. With this configuration, the multi-copter 90 according to this embodiment ensures that the retractable propellers SR are stored and unfolded in a simple manner.

Figure 5:
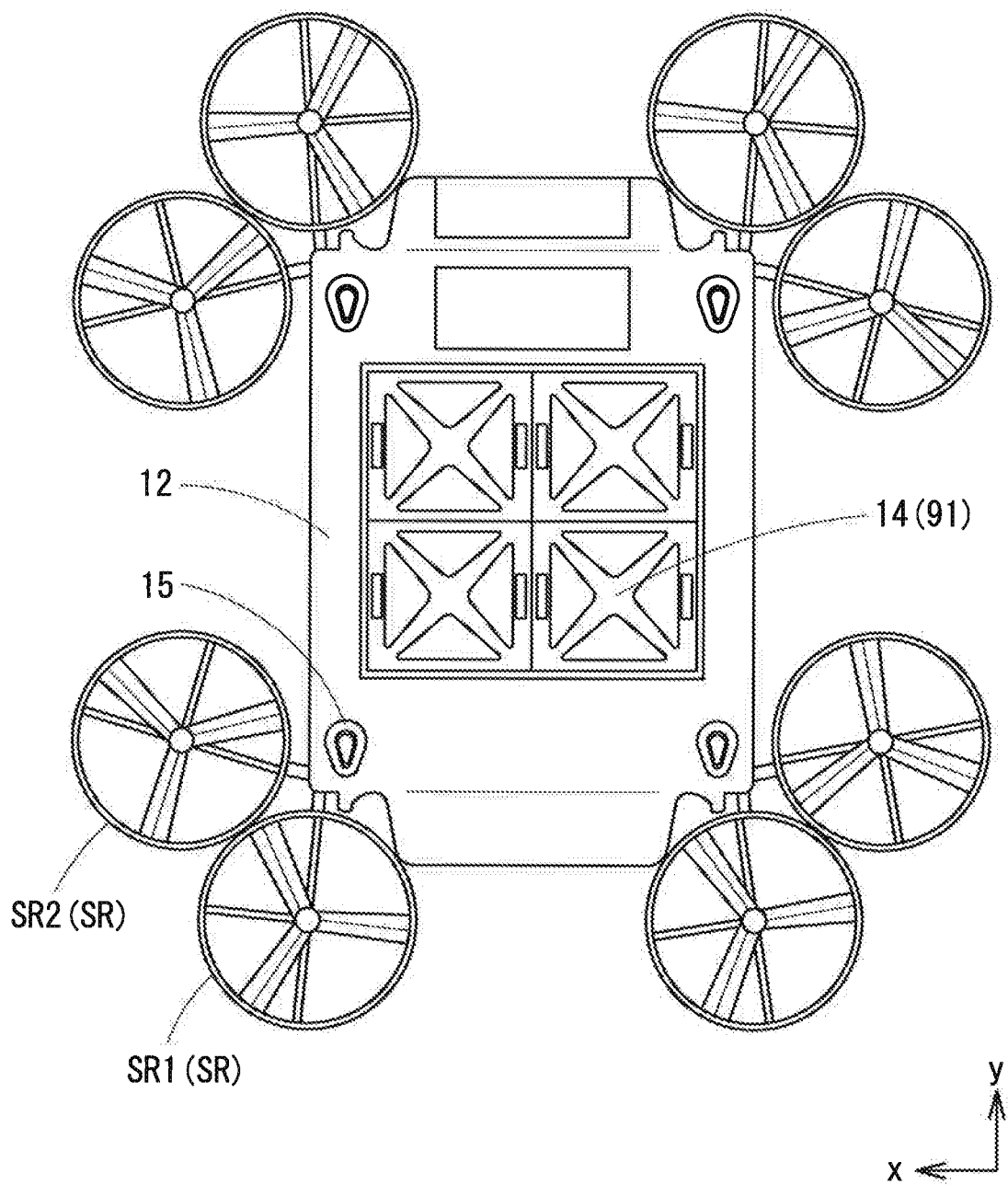
FIG. 5 is a plan view of the unmanned aerial vehicle illustrated in FIG. 1.

FIG. 5 is a plan view of the multi-copter 90 illustrated in FIG. 1. As illustrated in FIG. 5, the retractable propellers SR1, SR2 are expandable to positions at which the retractable propellers SR1, SR2 do not overlap each other in the circumferential direction of the body 12. More specifically, there is a 90° difference of spread angle between the retractable propellers SR1, SR2; the spread angle of the retractable propeller SR1 is 90° larger than the spread angle of the retractable propeller SR2. This ensures that the blades 42 of the retractable propellers SR1, SR2 are arranged at positions at which the blades 42 do not overlap each other in the circumferential direction of the body 12. The arrangement in which two propellers overlap each other in the vertical direction leads to such a problem that there is a large amount of loss of lift force, especially when the gap between the propellers is small. In the multi-copter 90 according to this embodiment, the retractable propellers SR1, SR2, which constitute one unit, are expandable to positions at which the blades 42 of the retractable propellers SR1, SR2 do not overlap each other. This minimizes the loss of lift force.

The retractable propeller SR according to this embodiment is turnable in a horizontal direction to be stored in the freight chamber 13 through the side opening 132. This configuration, however, is not intended as limiting the method of storing the retractable propeller SR in the freight chamber 13. For example, in such an application that the retractable propeller SR1 alone constitutes one unit of retractable propeller SR, the retractable propeller SR1 may be turned in a vertical direction and stored in the freight chamber 13 through the upper surface opening 131. For further example, the retractable propeller SR may be removed and stored in the freight chamber 13. Also, while this embodiment is described under the assumption that the retractable propeller SR is turned manually to be stored in the freight chamber 13, it is possible to use an actuator such as a servo mechanism for this purpose.

In a typical multi-copter, a plurality of arms radially extend from the center of the airframe, and a propeller is mounted on the leading end of each arm, similarly to the multi-copter 90. When the airframe is not in use and stored, the arms and the propellers take up much space. The multi-copter 90 includes the freight chamber 13, and the arms 11 and the blades 42 are storable in the freight chamber 13. This increases the number of unmanned aerial vehicles storable in a storage space of a predetermined area.

While the freight chamber 13 of the multi-copter 90 according to this embodiment is capable of containing the freight 91, the freight chamber 13 may be a storage space dedicated to the retractable propellers SR. In this case, the upper surface opening 131 may not necessarily be provided.

Figure 3:
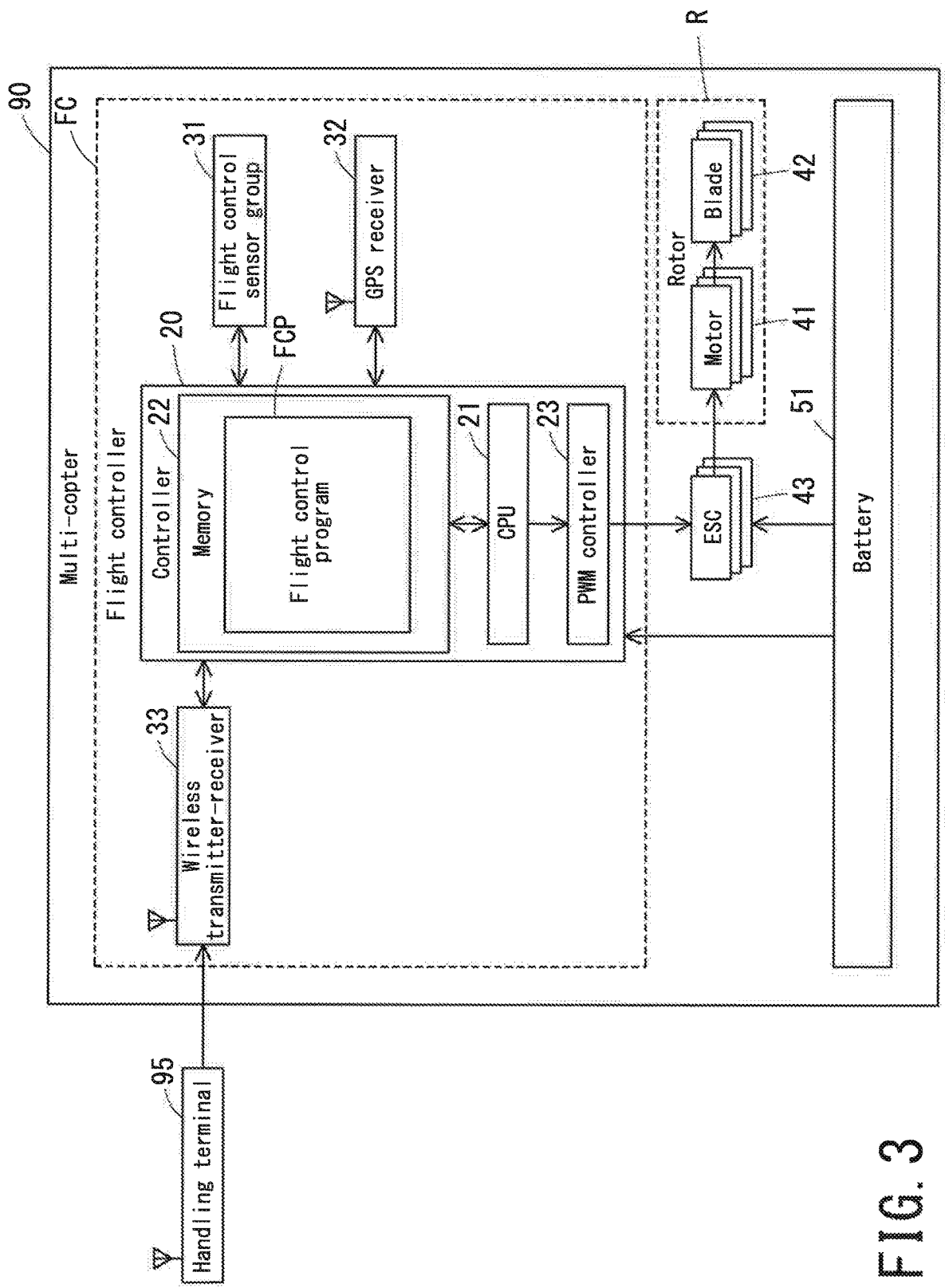
FIG. 3 is an enlarged view of the portion indicated by broken line A in FIG. 1.

As illustrated in FIGS. 1 and 3, the body 12 of the multi-copter 90 includes skid joint portions 15 on the upper surface of the body 12. The skid joint portions 15 are located at four corners of the upper surface of the body 12. The positions of the skid joint portions 15 respectively correspond to the positions of the legs (skids), not illustrated, of the multi-copter 90. Each of the skid joint portions 15 has a depression engageable with a leg. Providing the multi-copter 90 according to this embodiment with the skid joint portions 15 ensures that when the airframe 10 of another multi-copter 90 is placed on the airframe 10 of the multi-copter 90, the positioning of the airframes 10 is facilitated. Providing the skid joint portions 15 also enhances the stability of a stack of a plurality of airframes 10.

In the multi-copter 90 according to this embodiment, a plurality of airframes 10 can be stacked on top of each other. This enables the storage space to be used three-dimensionally, that is, makes the storage space an area of volume, with height added to the area of space of the storage space. Further, by storing the retractable propellers SR in the freight chamber 13, the number of retractable propellers SR storable in the storage space is maximized.

Figure 8:
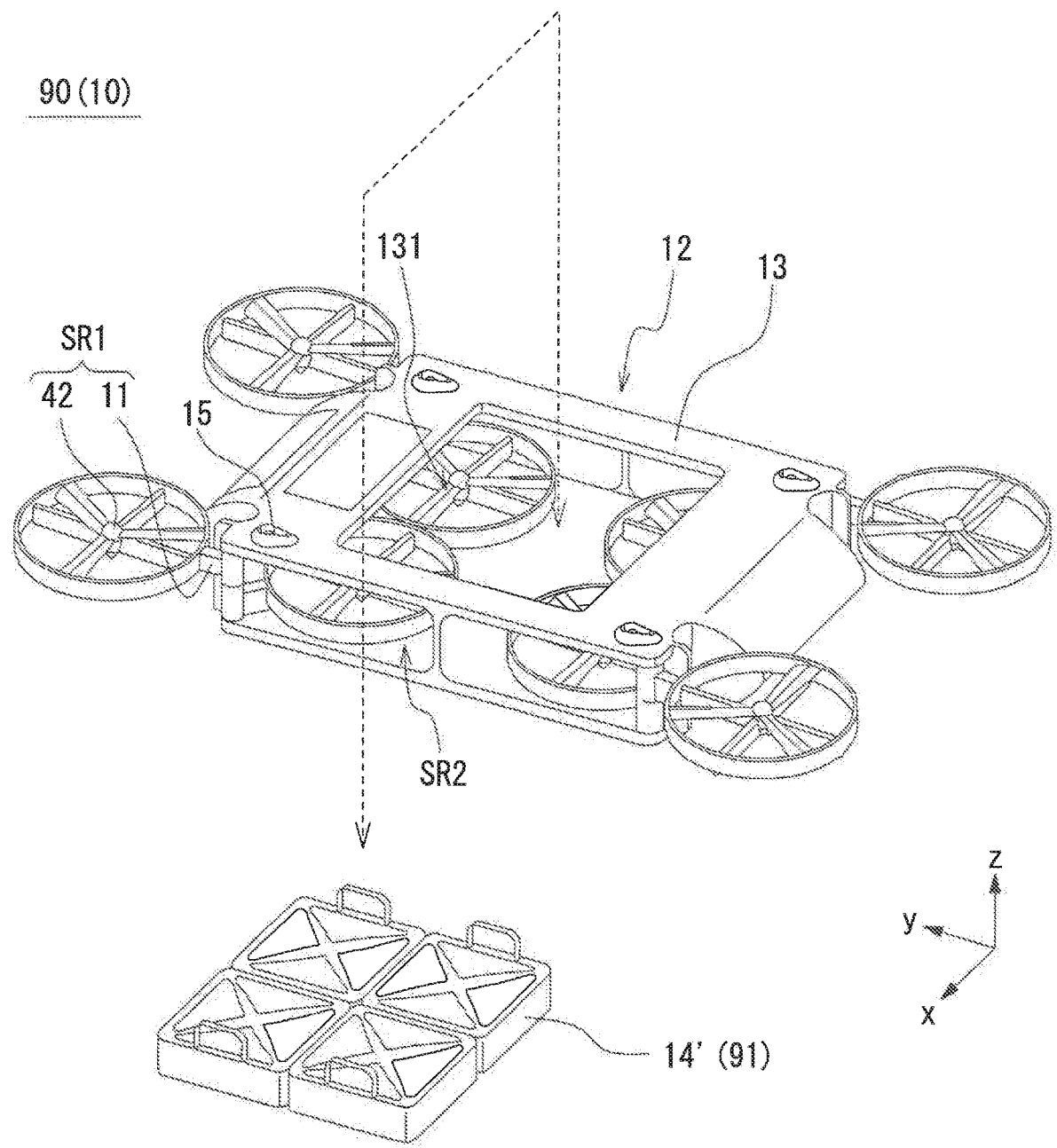
FIG. 8 is a perspective view of an exterior appearance of an unmanned aerial vehicle according to an embodiment having thin-type containers.

In this embodiment, when the multi-copter 90 is stored, the multi-copter 90 is without all of the containers 14, with only the retractable propellers SR stored in the freight chamber 13. This configuration is implemented under the assumption that the containers 14 are attached to the freight chamber 13 only while the freight 91 are carried. This enables the storage space to be used more efficiently. For this reason, the freight chamber 13 is used exclusively for the containers 14 or the retractable propeller SR. It is also possible, however, to contain the containers 14 and the retractable propeller SR simultaneously in the freight chamber 13. As illustrated in FIG. 8, a possible example is to: prepare a thin-type container 14', which is capable of containing a small piece of freight 91; attach the container 14' to the freight chamber 13; and store the lower retractable propeller SR2, among the retractable propellers SR1, SR2, in the freight chamber 13. Thus, the number of the rotors R to be driven is adjusted based on the load of the freight 91. This increases energy efficiency at the time of transportation of the freight 91.

Another Embodiment

Figure 6:
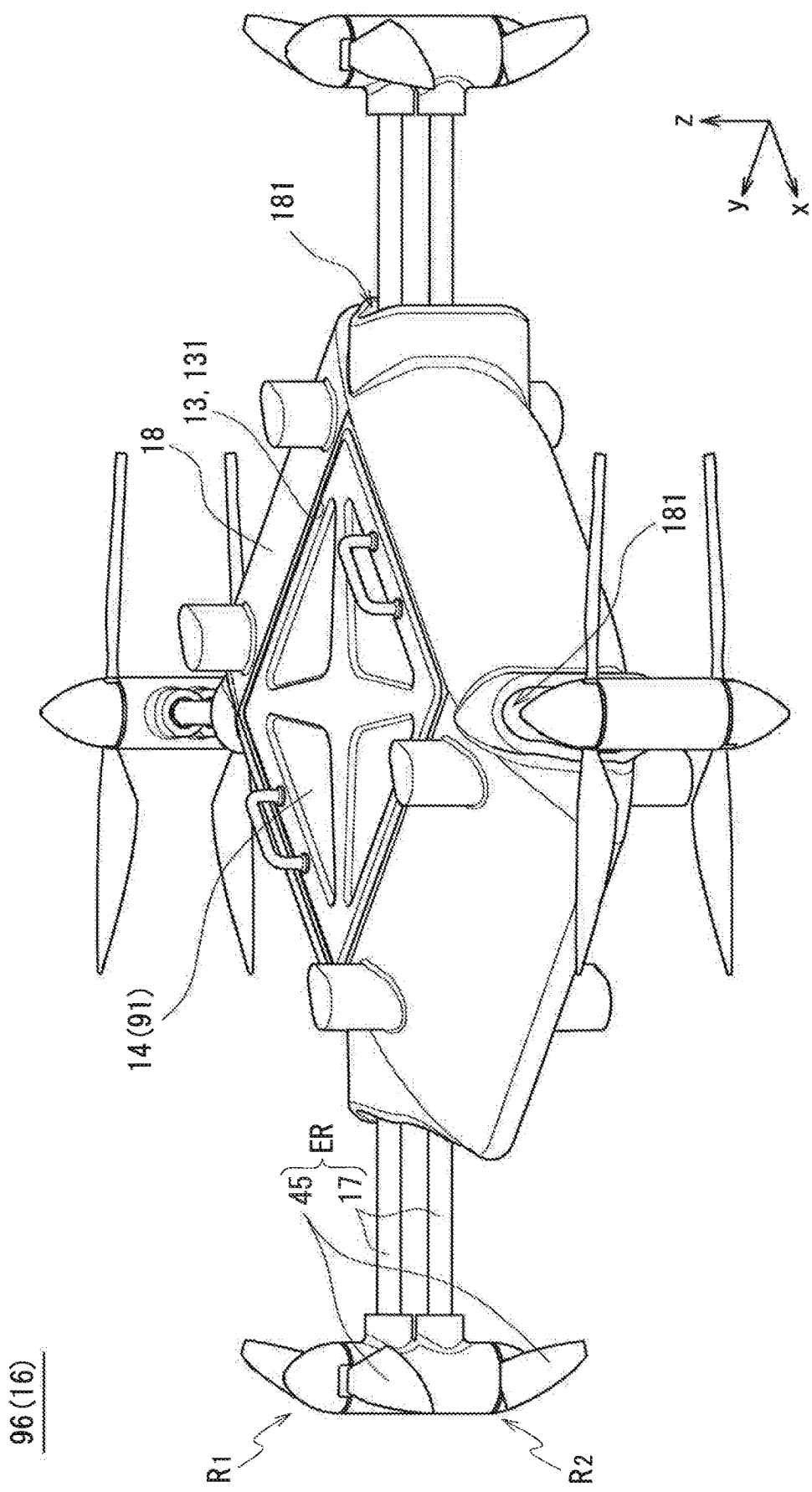
FIG. 6 is a perspective view of an exterior appearance of an unmanned aerial vehicle according to another embodiment.
Figure 7:
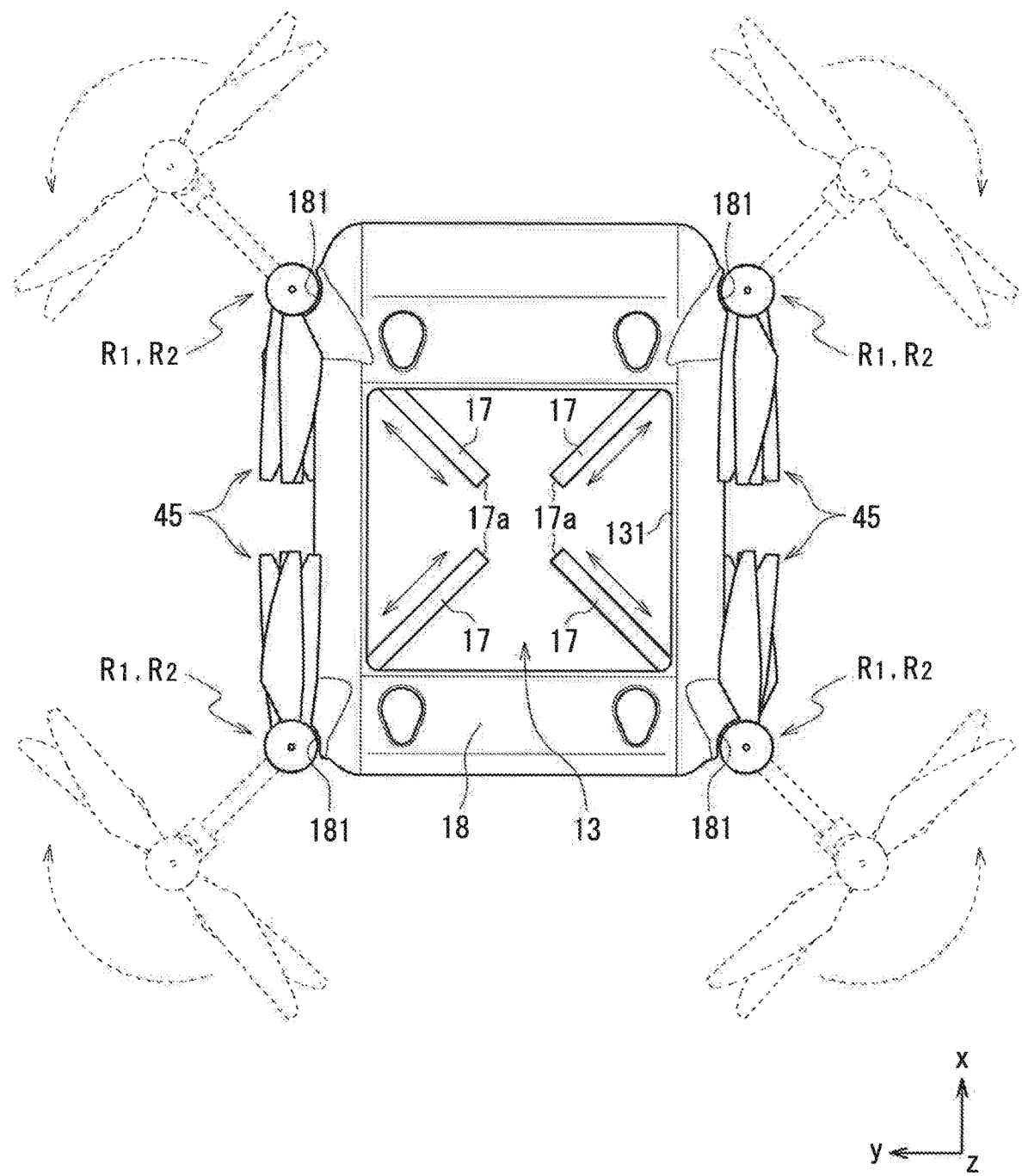
FIG. 7 is a plan view illustrating an accommodation structure in which the arms are contained.

Another embodiment of the present invention will be described below by referring to FIGS. 6 and 7. FIG. 6 is a perspective view of an exterior appearance of the multi-copter 96, which is an unmanned aerial vehicle according to another embodiment of the present invention. FIG. 7 is a plan view of an accommodation structure in which the arms 17 of the multi-copter 96 are contained. It is to be noted that in the following description, those elements identical or similar to each other in this embodiment and the previous embodiment have the same or identical reference numerals and will not be elaborated further upon here. Also, the flight functions of the multi-copter 96 are basically the same as the flight functions of the multi-copter 90 according to the previous embodiment and will not be elaborated further upon here.

An airframe 16 of the multi-copter 96 mainly includes: a box-shaped body 18, which has an approximately rectangular parallelepiped shape; and a plurality of arms 17, which radially extend in horizontal directions from portions of the body 18 corresponding to the apices of the body 18 in the circumferential direction. Each of the arms 17 is made up of two pipe materials parallel to each other in the vertical direction. At the leading end of each arm 17, two rotors R1, R2 are mounted. The rotors R1, R2 are aligned in the vertical direction in a coaxial manner. Each of the rotors R1, R2 includes a blade 45, which is foldable in circumferential directions. A combination of each arm 17 according to this embodiment and a corresponding blade 45 supported by the arm 17 constitutes a retractable propeller ER.

In the body 18, a freight chamber 13 is located. The freight chamber 13 has an upper surface opening 131 at an upper portion of the freight chamber 13. In the multi-copter 96 illustrated in FIG. 6, a single container 18 occupies the entire volume of the freight chamber 13.

Through holes 181 are formed on the outer peripheral surface of the body 18 at portions corresponding to the apices of the body 18. The through holes 181 are connected to the freight chamber 13. Each arm 17 illustrated in FIG. 6 has a base end portion 17a (see FIG. 7), which is the body 18 side end of the arm 17 in its longitudinal direction. The base end portion 17a is inserted through the through hole 181 and supported by the body 18 using a fixing structure, not illustrated.

As illustrated in FIG. 7, in the multi-copter 96 according to this embodiment, the arms 17 in the state illustrated in FIG. 6 can be further inserted into the through holes 181 so that the arms 17 are contained in the freight chamber 13 after the container 14 has been taken out of the freight chamber 13. Additionally, the blade 45 can be folded along the outer shape of the body 18. This ensures that the multi-copter 96 can be stored in a compact form. While the freight chamber 13 of the multi-copter 96 according to this embodiment is capable of containing the freight 91, the freight chamber 13 may be a storage space dedicated to the arms 17. In this case, the upper surface opening 131 may not necessarily be provided.

When the retractable propeller ER is expanded, the arms 17 are pulled out of the body 18, and the blades 45 are opened. Thus, in the multi-copter 96 according to this embodiment, the arms 17 are inserted and pulled into and out of the freight chamber 13 by sliding the arms 17 in their longitudinal directions. This ensures that the retractable propeller ER is stored and unfolded in a simple manner.

Embodiments of the present invention have been described hereinbefore. The present invention, however, will not be limited to the above-described embodiments but may have various modifications without departing from the scope of the present invention.

The invention claimed is:
1. An unmanned aerial vehicle comprising:
a plurality of propellers; and
an airframe including:
   a body having a hollow freight chamber integral with the body; and
   a plurality of arms supporting the plurality of propellers,
wherein:
   a retractable propeller is formed of a combination of an arm of the plurality of arms and a propeller of the plurality of propellers,
   the retractable propeller is partially or entirely storable in the freight chamber,
   the freight chamber includes (i) a first opening configured to receive at least one container into the freight chamber at an upper side of the freight chamber, and (ii) a second opening configured to receive the retractable propeller into the freight chamber at a side portion of the freight chamber, and the unmanned aerial vehicle is configured to fly with the at least one container disposed within the freight chamber.

2. The unmanned aerial vehicle according to claim 1, wherein the airframe is configured to receive a secondary airframe mounted on a top surface of the airframe.

3. The unmanned aerial vehicle according to claim 1, wherein:
- each arm of the plurality of arms includes a base end portion located at a side of the body in a longitudinal direction of the each arm of the plurality of arms, the base end portion being rotatably supported by the body, and
- the retractable propeller is configured to be stored in the freight chamber or expanded from the freight chamber by rotating the retractable propeller about the base end portion such that the base end portion is at a center of rotation of the retractable propeller.

4. The unmanned aerial vehicle according to claim 3, wherein:
- the base end portion is configured to rotate in a horizontal direction relative to the body, and
- the unmanned aerial vehicle includes a plurality of retractable propellers including the retractable propeller, the plurality of retractable propellers forming a plurality of units, each unit of the plurality of units being formed of a pair of retractable propellers of the plurality of retractable propellers having a common center of rotation at respective base end portions.

5. The unmanned aerial vehicle according to claim 4, wherein the pair of retractable propellers of a unit of the plurality of units are expandable so as to not overlap in a circumferential direction of the body.

6. The unmanned aerial vehicle according to claim 1, further comprising:
- the at least one container configured to be attached to and detached from the freight chamber,
- a piece of freight is disposed in the at least one container, and the at least one container is disposed within the freight chamber.

7. The unmanned aerial vehicle according to claim 6, wherein the at least one container has a standardized shape.

8. The unmanned aerial vehicle according to claim 6, wherein the retractable propeller and the at least one container are configured to be stored simultaneously in the freight chamber.

* * * * *